UNITED STATES PATENT OFFICE.

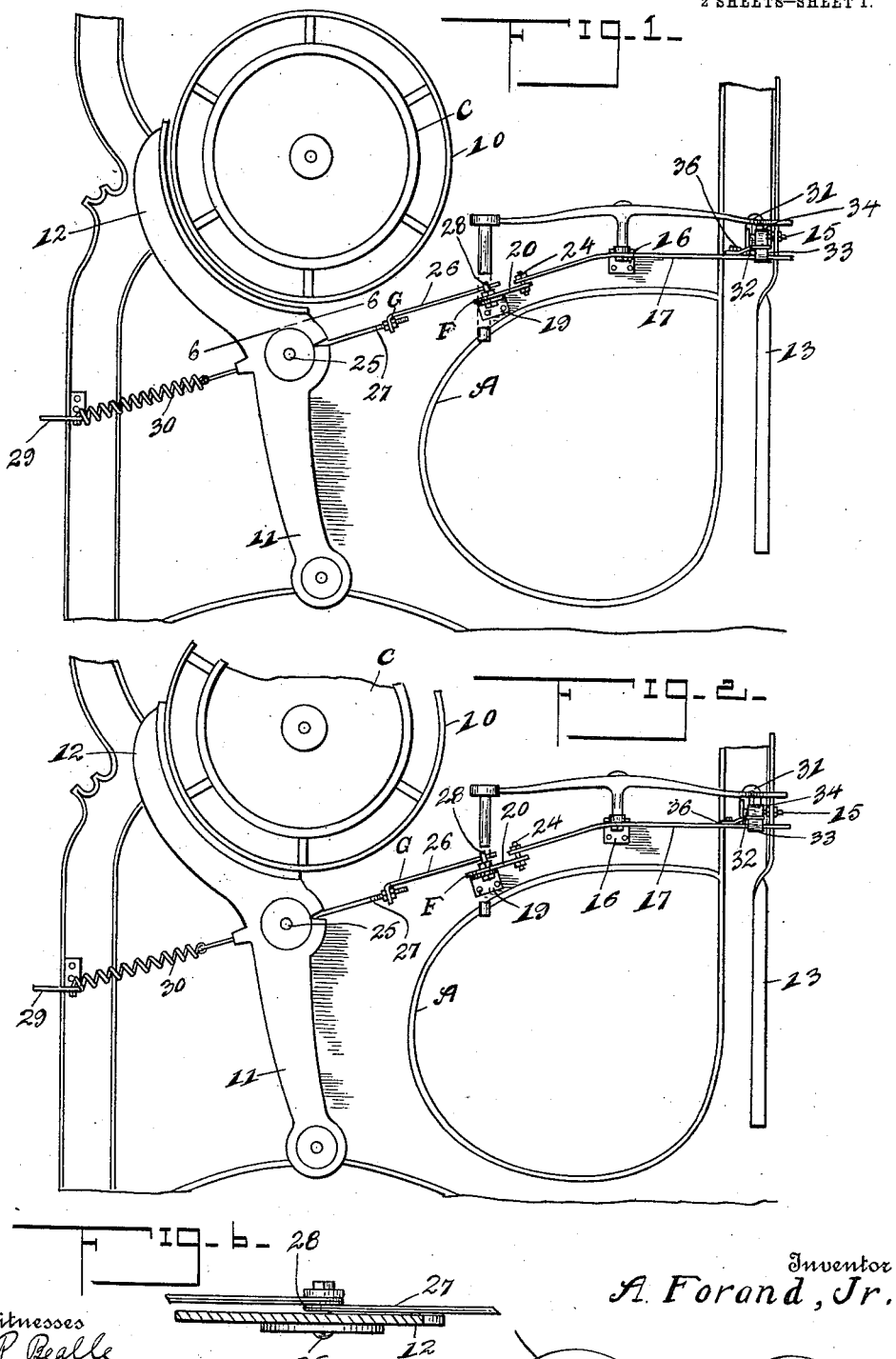

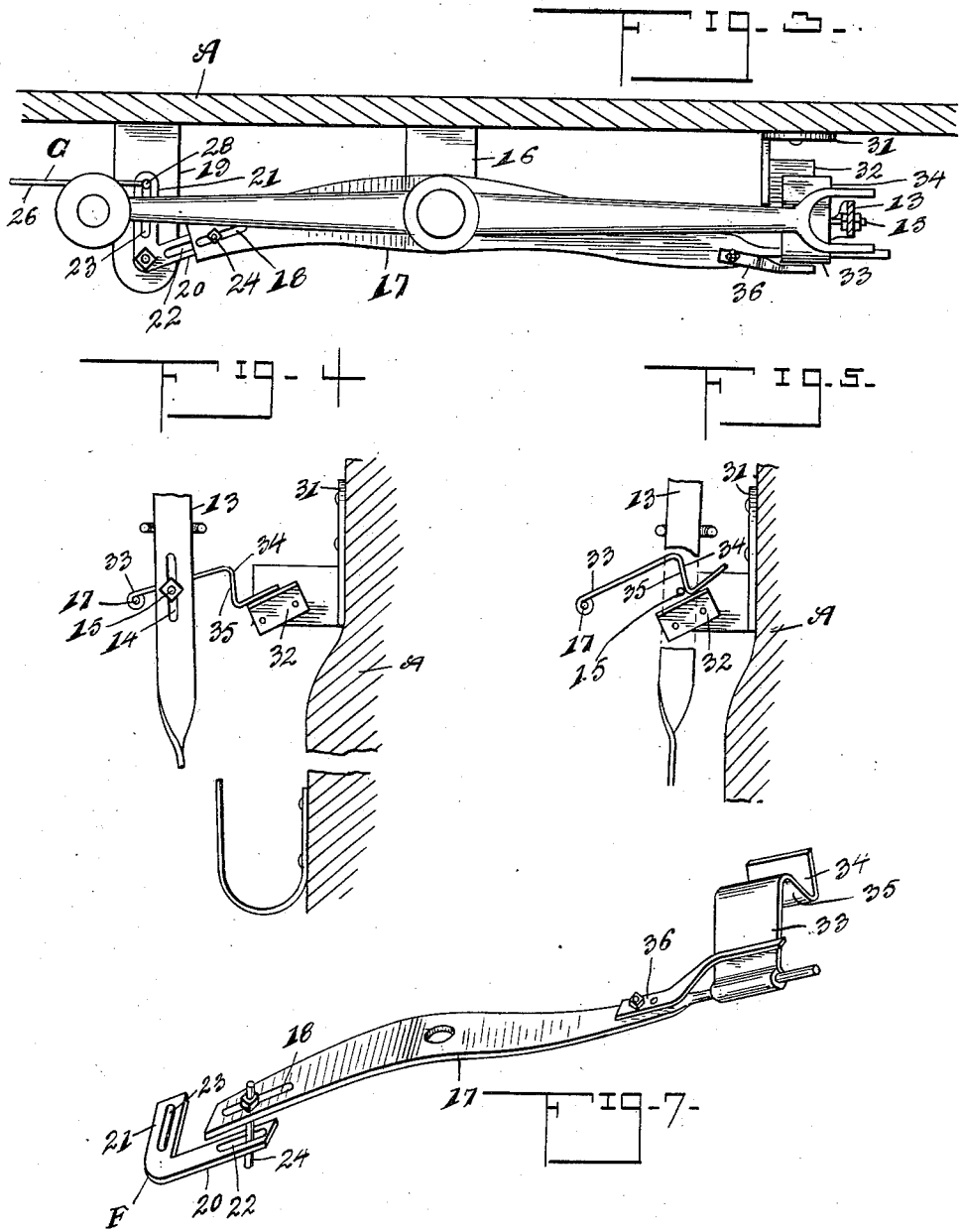

ALEXIS FORAND, JR., OF FALL RIVER, MASSACHUSETTS, ASSIGNOR OF ONE-HALF TO WILFRID J. FORAND, OF FALL RIVER, MASSACHUSETTS.

BRAKE MECHANISM FOR LOOMS.

1,059,601.          Specification of Letters Patent.      Patented Apr. 22, 1913.

Application filed November 20, 1912. Serial No. 732,533.

*To all whom it may concern:*

Be it known that I, ALEXIS FORAND, Jr., a citizen of the United States, residing at Fall River, in the county of Bristol, State of Massachusetts, have invented certain new and useful Improvements in Brake Mechanisms for Looms; and I do hereby declare the following to be a full, clear, and exact description of the invention, such as will enable others skilled in the art to which it appertains to make and use the same.

This invention relates to brake mechanisms for looms.

The object of the invention resides in the provision of a brake mechanism for looms which will operate automatically to bring all parts of the loom to an instant stop immediately upon the knock off lever being operated to shift the belt from the fixed pulley to the loose pulley and thereby serving to prevent the die away movements of the loom which result in several picks of the shuttle and imperfect work which has to be taken out before the loom can be started up again.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a loom showing the improved brake mechanism applied, all parts of the loom being omitted except those which are essential to an understanding of the invention. Fig. 2 a view similar to Fig. 1 showing the parts in the position they would occupy when the knock off lever has been operated to shift the belt from the fixed pulley to the loose pulley and the brake mechanism has been rendered active. Fig. 3 a plan view of what is shown in Fig. 1. Fig. 4 a front view of what is shown in Fig. 1. Fig. 5 a front view of what is shown in Fig. 2. Fig. 6 a section on the line 6—6 of Fig. 1. Fig. 7 a detail perspective view of certain of the operating connections of the brake mechanism, and Fig. 8 a detail perspective view of the member which serves to effect the disengagement of the knock off lever from the brake mechanism during the movement of said knock off lever in shifting the belt from the fixed pulley to the loose pulley.

Referring to the drawings, A indicates the loom frame, and C the fixed pulley, the latter being provided at its inner side with a raised portion 10. Pivotally mounted upon the frame A is a stem 11 and pivotally connected to the free or upper end of this stem is a brake shoe 12 adapted for coöperation with the raised portion 10 of the fixed pulley. Secured to the forward end of the frame A is a knock off lever 13 provided with a slot 14 in which is mounted for vertical adjustment a transverse pin 15. Pivotally mounted upon a bracket 16 secured to the frame A is a two armed lever 17 the outer end of which overlies the outer edge of the knock off lever 13 while the inner end thereof is provided with a slot 18. Mounted upon the frame A adjacent the inner end of the lever 17 is a bracket 19 and pivoted upon this bracket is an angle lever F including arms 20 and 21 provided with slots 22 and 23 respectively. The arm 20 of the angle lever F is connected to the adjacent end of the lever 17 by means of a pin 24 extending through the slots 18 and 22. The arm 21 of the angle lever F is connected to the pivot pin 25 which secures the stem 11 and the brake shoe 12 together by means of a rod G which includes adjustably connected sections 26 and 27, the outer end of the section 26 being provided with a pin 28 disposed at right angles thereto and extending through the slot 23, while the outer end of the section 27 terminates in an eye portion 28 engaged over the pin 25. Mounted on the frame A at the rear end of the latter is a bracket 29 to which is secured one end of a tension spring 30, the other end of said tension spring being suitably connected to the pin 25. By this construction it will be apparent that the spring 30 constantly tends to hold the brake shoe 12 out of engagement with the raised portion 10 of the fixed pulley C. Mounted upon the frame A adjacent the forward end of the lever 17 and adjustable vertically of the frame is a bracket 31 which supports a downwardly inclined plate 32. Pivotally mounted upon the forward end of the lever 17 is an arm 33 the free end of which is off set as at 34 and forms a shoulder 35, said off set end 34 being adapted for coöperation with the plate 32. Upward movement of the arm 33 is limited by means of an angle member 36 pivotally mounted on the forward end of the lever 17 and overlying the arm 33, said angle member 36 being capable of adjustment whereby the limit of upward movement of the arm 33 may be varied.

Assuming the belt to be traveling on the fixed pulley C it will be apparent that as soon as the knock off lever 13 is operated to shift the belt from the fixed to the loose pulley the pin 15 will engage the shoulder 35 and cause the lever 17 to be rocked on its pivot so as to operate the lever F and connections G to apply the brake shoe 12 to the raised portion 10 of the fixed pulley C. This application of the brake shoe 12 will be intensified as the knock off lever 13 continues in its movement. During final movement of the knock off lever 13 the off set portion 34 will ride up the plate 32 until the pin 15 is able to pass beneath the off set portion 34, when continued movement of the knock off lever 13 will be without effect on the lever 17 and the latter will be returned to its normal position under the influence of the spring 30, which spring also operates to remove the brake shoe 12 from engagement with the raised portion 10 as soon as the pin 15 passes beneath the off set portion 34.

What I claim is:—

In a loom, the combination of a brake wheel fixed on the drive shaft of the loom, a brake shoe pivoted to said loom for coöperation with the brake wheel, spring means constantly tending to hold the brake shoe out of engagement with the brake wheel, a belt shifting lever, a lever pivoted on said loom, an arm pivoted on one end of said lever having an offset free end and a resultant shoulder, connections between said last named lever and the brake shoe whereby the movement of said lever in one direction will force the brake shoe into engagement with the brake wheel against the influence of said spring means, a pin carried by said shifting lever and adapted to engage the shoulder on said arm to actuate the second named lever and render the brake shoe active when the shifting lever is moved to throw the belt from the fixed to the loose pulley, and means for releasing said pin from engagement with said shoulder during the final movements of the shifting lever in throwing the belt from the fixed to the loose pulley.

In testimony whereof, I affix my signature in the presence of two witnesses.

ALEXIS FORAND, Jr.

Witnesses:
WILFRID J. FORAND,
ADELARD SAURETTE.